C. H. KUGLER.
SHOCK ABSORBER.
APPLICATION FILED APR. 14, 1919.
1,389,054.
Patented Aug. 30, 1921.
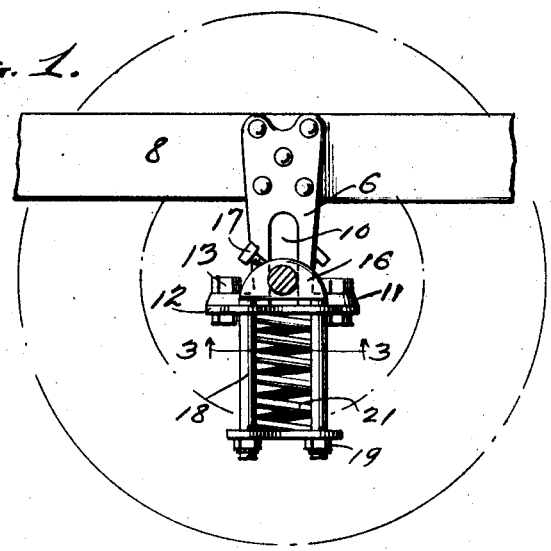
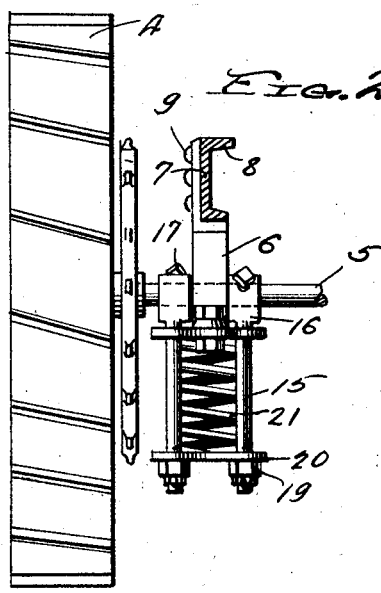
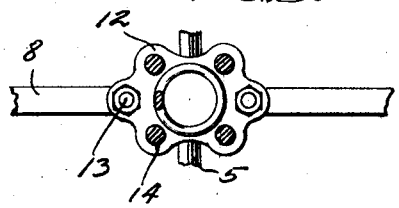
Inventor
Charles H. Kugler

UNITED STATES PATENT OFFICE.

CHARLES H. KUGLER, OF LEXINGTON, NEBRASKA.

SHOCK-ABSORBER.

1,389,054.  Specification of Letters Patent.  Patented Aug. 30, 1921.

Application filed April 14, 1919. Serial No. 290,069.

*To all whom it may concern:*

Be it known that I, CHARLES H. KUGLER, a citizen of the United States, residing at Lexington, in the county of Dawson and State of Nebraska, have invented certain new and useful Improvements in Shock-Absorbers, of which the following is a specification.

My invention relates to new and useful improvements in shock absorbers and more particularly to the type employing a compression spring whereby shocks imposed upon a vehicle axle will be absorbed before reaching the body of the vehicle.

An important object of my invention is to provide a device of the above mentioned character which may be applied to any kind of a vehicle.

Another important object of my invention resides in the provision of a device embodying means attached to a vehicle axle which will permit vertical movement of the axle and prevent any lateral movement thereof.

Another object of my invention resides in the provision of a device embodying spring means so positioned with relation to the other parts that the spring is prevented from accidentally becoming disengaged from its co-acting parts.

Another object of my invention resides in the provision of a device embodying parts which may be readily disconnected with their co-acting parts to facilitate replacement of any breakage or whereby the device may be packed and shipped in a comparatively small space.

A still further object of my invention is to provide a device of the above mentioned character, which is strong, durable, can be manufactured at a minimum cost, and is efficient in practice.

Other objects and advantages of this invention will be apparent during the course of the following description.

The invention also consists in certain other features of construction and in the combination and arrangement of the several parts to be hereinafter fully described and specifically pointed out in the appended claims.

In the accompanying drawings forming a part of the application, and in which like numerals are employed to designate like parts through out the same, Figure 1 is a side elevation of the device applied to a vehicle.

Fig. 2 is a rear elevation, showing the means for attaching the invention to a vehicle, and Fig. 3 is a horizontal section taken on the line 3—3 of Fig. 1.

In the drawings, wherein is illustrated preferred embodiment of my invention, the numeral 4 designates the wheel of a vehicle, in this instance being a tractor wheel, while the numeral 5 indicates the usual axle.

A supporting member 6 is provided at its top end with an L-shaped cut out portion 7 to snugly engage the side and bottom of the usual channel iron supporting beam 8. To this supporting beam 8, the upper end of the supporting member 6 is secured by means of bolts, rivets or the like indicated by the numeral 9. A slot 10 is provided in the lower end of the supporting member 6 and this slot extends to the bottom of said member. As more clearly shown in Fig. 1 of the drawings, outwardly extending ears 11 are formed upon the lowermost end of the supporting member. The axle of the vehicle extends through the slot 10 and is normally positioned in the lowermost end of this slot.

A guide plate 12 is secured to the underside of the ears 11 by means of the bolts 13. As shown in Fig. 1, this guide plate closes the lower end of the slot 10. Pair of openings 14 are provided in the plate 12 on opposite sides of the supporting member 6, for a purpose which will hereinafter appear.

A spring supporting member indicated generally by the numeral 15, is provided with a head 16 having an opening therethrough for the reception of the vehicle axle. One of these members 15 is positioned upon each side of the supporting member 6 and is secured to the axle by means of nut screws 17. Each spring supporting member is provided with a pair of spaced depending legs 18 which are slidably mounted through a pair of openings 14 on one side of the plate 12. The free ends of these legs extend a substantial distance below the guide plate 12 and are screw threaded for the reception of the retaining nuts 19. A plate 20 having openings therethrough for the reception of the free ends of the legs 18, is positioned upon the legs and retained thereon by the nuts 19.

A compression spring 21 is positioned between the legs 18, so that one end of the spring abuts with the guide plate 12 and its opposite end abuts with the plate 20. As more clearly shown in Figs. 1 and 2 of the drawings, the legs of the spring supporting members are such a distance apart as to prevent the spring 21 from becoming displaced.

When the wheel 4 of the vehicle runs over a rock or other obstruction, the axle of the vehicle will be forced upwardly of the slot 10. As the axle moves upwardly, it will carry with it the spring supporting members 15, which in turn will move the plate 20 upwardly to compress the coil spring 21, and thereby absorb the shock before it reaches the vehicle body. When the wheel of the vehicle runs into a depression in the road and causes the body of the vehicle to move downwardly, it will be seen that the supporting member 6 will be forced downwardly so that the upper portion of the slot 10 is forced closer to the axle. The downward movement of the supporting member 6 will of course force the guide plate 12 downwardly of the legs 18 and accordingly compress the spring to relieve the vehicle body from abrupt shocks and jars.

By providing the legs 18 on the spring supporting member 15, it will be seen that the axle is properly guided in its vertical movement as the legs 18 operate through the openings 14 in the guide plate 12.

The foregoing description and the drawings have reference to what may be considered the preferred, or approved, form of invention. It is to be understood that I may make such changes in construction and arrangement and combination of parts, materials, dimensions, etc., as may prove expedient and fall within the scope of the appended claims.

Having thus fully described my invention, what I claim as new and desire to secure by Letters Patent, is:

1. The combination with a vehicle and axle therefor, of a supporting member secured to the vehicle and having a slot therein for the reception of said axle, a member carried by said axle on each side of said slotted member, means for joining said members, and spring means interposed between said joining means and said slotted member.

2. The combination with a vehicle and axle therefor, of a supporting member secured to the vehicle and having a slot therein for the reception of said axle, a guide plate secured to said member, a pair of spring supporting members carried by the axle upon opposite sides of said slotted member, each spring supporting member being provided with legs passing through said guide plate, and spring means carried by said supporting members and acting against said guide plate.

3. The combination with a vehicle body, and axle therefor, of a member secured thereto and having a slot therein for the reception of said vehicle axle, a guide plate secured to the lower end of said member and closing the end of said slot, said plate having a pair of spaced openings adjacent each of its opposite edges, spring supporting members carried by the axle on opposite sides of said slotted member, each spring supporting member having a pair of spaced legs passing through the openings in said guide plate, a plate joining the free ends of the legs of the spring supporting members, and a compression spring interposed between said plate and the guide plate.

In testimony whereof I affix my signature in presence of two witnesses.

CHARLES H. KUGLER.

Witnesses:
J. F. TEMPLE,
H. F. MOIN.